(12) United States Patent
Kozuru et al.

(10) Patent No.: US 9,144,161 B2
(45) Date of Patent: Sep. 22, 2015

(54) SWITCHGEAR

(75) Inventors: Susumu Kozuru, Tokyo (JP);
Katsuhiko Horinouchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 224 days.

(21) Appl. No.: 14/001,516

(22) PCT Filed: Sep. 26, 2011

(86) PCT No.: PCT/JP2011/071820
§ 371 (c)(1),
(2), (4) Date: Aug. 26, 2013

(87) PCT Pub. No.: WO2012/124195
PCT Pub. Date: Sep. 20, 2012

(65) Prior Publication Data
US 2013/0327623 A1    Dec. 12, 2013

(30) Foreign Application Priority Data

Mar. 16, 2011 (JP) ................................. 2011-057947

(51) Int. Cl.
*H05K 5/02*    (2006.01)
*H02B 1/28*    (2006.01)
*H02B 13/025*  (2006.01)

(52) U.S. Cl.
CPC ............ *H05K 5/0213* (2013.01); *H02B 13/025* (2013.01)

(58) Field of Classification Search
CPC .................................................. H02B 13/025
See application file for complete search history.

(56) References Cited

U.S. PATENT DOCUMENTS 5,574,624 A * 11/1996 Rennie et al. .................. 361/676
5,689,097 A * 11/1997 Aufermann et al. ........... 218/157

(Continued)

FOREIGN PATENT DOCUMENTS

CN    2245284 Y    1/1997
CN    201536232 U  7/2010

(Continued)

OTHER PUBLICATIONS

Office Action (First Office Action) issued on Feb. 27, 2015, by the State Intellectual Property Office of the People's Republic of China in corresponding Chinese Patent Application No. 201180069295.2, and an English Language Translation of the Office Action. (15 pages).

(Continued)

*Primary Examiner* — Robert J Hoffberg
(74) *Attorney, Agent, or Firm* — Buchanan Ingersoll & Rooney PC

(57) ABSTRACT

A bus is placed at the center of a housing. Breakers and cables forming branch circuits branching from the bus are placed at the upper and lower stages in the housing, being displaced in the right-left direction. Spaces formed between the side wall of the housing and the side walls of an upper-stage breaker compartment and an upper-stage cable compartment containing the upper-stage apparatuses are used as paths leading to the housing ceiling for a bus compartment, and a lower-stage breaker compartment and a lower-stage cable compartment containing the lower-stage apparatuses. The bus compartment and all the apparatus compartments each directly lead to a ceiling portion of the housing and have an opening portion. Pressure discharge plates are provided on the opening portions.

3 Claims, 9 Drawing Sheets

(56) References Cited

U.S. PATENT DOCUMENTS

| | | | |
|---|---|---|---|
| 5,710,402 A * | 1/1998 | Karnbach et al. | 218/157 |
| 5,892,195 A * | 4/1999 | Aufermann et al. | 218/157 |
| 6,407,331 B1 * | 6/2002 | Smith et al. | 174/50 |
| 6,410,844 B1 * | 6/2002 | Bruner et al. | 174/17 VA |
| 6,417,443 B1 * | 7/2002 | Smith | 174/17 VA |
| 7,095,606 B2 * | 8/2006 | Mahn et al. | 361/612 |
| 7,236,352 B2 * | 6/2007 | Dalis | 361/608 |
| 7,821,774 B2 * | 10/2010 | Josten et al. | 361/605 |
| 8,101,881 B2 * | 1/2012 | Miller et al. | 218/157 |
| 8,242,395 B2 * | 8/2012 | Josten et al. | 200/306 |
| 8,451,589 B2 * | 5/2013 | Milovac et al. | 361/611 |
| 8,482,903 B2 * | 7/2013 | Milovac et al. | 361/605 |
| 8,680,420 B2 * | 3/2014 | Monahan | 218/157 |
| 8,733,853 B2 * | 5/2014 | Gingrich | 312/216 |
| 8,733,855 B2 * | 5/2014 | Josten et al. | 312/223.1 |
| 8,785,770 B2 * | 7/2014 | Gingrich | 174/17 VA |
| 8,791,361 B2 * | 7/2014 | Gingrich | 174/17 VA |
| 8,842,421 B2 * | 9/2014 | Gingrich | 361/676 |
| 2013/0143478 A1 * | 6/2013 | Arcos et al. | 454/184 |

FOREIGN PATENT DOCUMENTS

| | | | | |
|---|---|---|---|---|
| JP | 59-132303 U | | 9/1984 | |
| JP | 2-114305 U | | 9/1990 | |
| JP | 5-56517 A | | 3/1993 | |
| JP | 8-191512 A | | 7/1996 | |
| JP | 10-322811 A | | 12/1998 | |
| JP | 2000-228803 A | | 8/2000 | |
| JP | 2007221878 A | * | 8/2007 | H02B 1/28 |
| JP | 2009201274 A | * | 9/2009 | H02B 1/28 |

OTHER PUBLICATIONS

International Search Report (PCT/ISA/210) issued on Dec. 27, 2011, by the Japanese Patent Office as the International Searching Authority for International Application No. PCT/JP2011/071820.

* cited by examiner (a)　　　　　　　(b)

(a)　　　　　　　(b)

(a) (b)

(a) (b)

(a)    (b)

(a)  (b)

SWITCHGEAR

TECHNICAL FIELD

The present invention relates to a metal-enclosed switchgear, and particularly, to its structure for pressure discharge and ventilation.

BACKGROUND ART

As a conventional switchgear having a pressure discharge plate, for example, a switchgear is disclosed in which: a main circuit apparatus chamber containing withdrawable breakers individually, which are piled at multiple stages in the vertical direction, and a control apparatus chamber are arranged in the right-left direction on the front side of a housing made of grounded metal; a common pressure discharge duct chamber extending in the vertical direction is provided in back of the control apparatus chamber; in back of these, a vertical bus chamber, a current transformer chamber, a horizontal bus chamber, and a cable chamber are provided; the above chambers are partitioned by partition walls; and among the partitioned chambers, except the horizontal bus chamber, partitioned chambers contacting a ceiling portion have pressure discharge plates at the ceiling portion, and partitioned chambers not contacting the ceiling portion are linked with the common pressure discharge duct chamber which has a pressure discharge plate at the ceiling portion (see Patent Document 1).

In addition, for example, an enclosed switchboard is disclosed in which: the inside of the board housing is partitioned into breaker chambers and cable chambers at upper and lower stages and a main bus chamber, which are separated from each other by partition walls; exhaust ducts extending in the vertical direction are provided at the center and the back of the inside of the board housing; an apparatus chamber provided at the upper stage has an exhaust opening directly on a ceiling; the breaker chamber at the lower stage, the cable chamber at the lower stage, and the main bus chamber communicate with the ceiling side through the exhaust ducts, and are provided with respective exhaust openings on the ceiling; and each exhaust opening has a pressure discharge plate (see Patent Document 2).

CITATION LIST

Patent Document

Patent Document 1: Japanese Laid-Open Patent Publication No. 10-322811 (Pages 3 and 4 and FIGS. 1 and 2)
Patent Document 2: Japanese Laid-Open Patent Publication No. 2000-228803 (Page 3 and FIGS. 1 and 2)

SUMMARY OF THE INVENTION

Problems to be Solved by the Invention

In the switchgear as shown in Patent Document 1, when a short-circuit accident or the like has occurred inside an apparatus chamber not directly having a pressure discharge plate, the pressure in this chamber is increased by air heated and expanded by arc. Then, first, the pressure discharge plate leading to the common pressure discharge duct chamber opens, and subsequently, the pressure discharge plate on the ceiling of the common pressure discharge duct chamber opens, whereby high-temperature and high-pressure gas is discharged to the outside.

In addition, in the switchgear as shown in Patent Document 2, when a short-circuit accident or the like has occurred in the apparatus chamber provided at the lower stage, heated and expanded air moves through the exhaust duct to the ceiling side, the pressure discharge plate provided on the ceiling side opens, and then high-temperature and high-pressure gas is discharged to the outside, whereby pressure increase inside the switchgear is suppressed.

However, in the structure as shown in Patent Document 1 which discharges pressure via the common pressure discharge duct chamber, in order to prevent influence on other chambers communicating with the common pressure discharge duct chamber, a pressure discharge plate is also provided at a portion leading to the common pressure discharge duct chamber. Therefore, there are problems that resistance to a pressure discharge fluid upon an accident increases and that work for manufacture and assembly of the common pressure discharge chamber increases.

In addition, in the structure as shown in Patent Document 2 of providing the individual pressure discharge paths by the exhaust duct, high-temperature and high-pressure gas generated upon an internal short-circuit accident follows a path that, first, the gas is discharged from the exhaust opening of the corresponding chamber to the exhaust duct in the horizontal direction, and then the flowing direction changes to the orthogonal direction, so that the gas reaches the discharge opening at the ceiling portion. Therefore, also in this case, the fluid resistance increases.

Therefore, it is necessary to enhance the stiffness of the switchgear housing, including portions such as, for example, a door or a cover, where the high-temperature and high-pressure gas can blow out of the switchgear. Particularly, in the case of significant electric accident where failure current is large and failure duration time is long, the internal pressure increase value is large and the intensity of discharge of the high-temperature and high-pressure gas increases. Therefore, there is a problem that the cost for manufacturing the switchgear increases due to work such as further reinforcing the stiffness of the housing of the switchgear, including a door and a cover portion facing the outside.

The present invention has been made to solve the above problems, and an object of the present invention is to, by modifying a path leading from a compartment containing a main circuit apparatus to a pressure discharge opening provided at a ceiling portion, suppress pressure increase in the compartment caused by an internal short-circuit accident or the like.

Solution to the Problems

In a switchgear according to the present invention, the inside of a housing is partitioned into a plurality of compartments, and a bus and apparatuses forming two or more lines of branch circuits branching from the bus are respectively contained in the plurality of compartments. The apparatuses forming the branch circuits are placed at an upper stage and a lower stage in the housing and are displaced from each other in the right-left direction. Spaces formed between a side wall of the housing and side walls of upper-stage apparatus compartments containing the apparatuses placed at the upper stage, are used as paths leading to a housing ceiling for a bus compartment containing the bus and lower-stage apparatus compartments containing the apparatuses placed at the lower stage. The bus compartment and all the apparatus compartments are each individually connected directly to a ceiling portion of the housing and have an opening portion on the ceiling portion, which opens to the outside.

Effect of the Invention

According to the switchgear of the present invention, the apparatuses forming the branch circuits are placed at an upper stage and a lower stage in the housing and are displaced from each other in the right-left direction. Spaces formed between a side wall of the housing and side walls of upper-stage apparatus compartments containing the apparatuses placed at the upper stage, are used as paths leading to a housing ceiling for a bus compartment containing the bus and lower-stage apparatus compartments containing the apparatuses placed at the lower stage. The bus compartment and all the apparatus compartments are each individually connected directly to a ceiling portion of the housing and have an opening portion on the ceiling portion, which opens to the outside. Therefore, when high-pressure and high-temperature gas generated due to a short-circuit accident or the like inside the housing of the switchgear is discharged, the pressure can be directly discharged from the corresponding compartment through the opening portion provided on the ceiling portion above the compartment. Thus, increase in the internal pressure can be efficiently suppressed.

In addition, reinforcements for the wall surface of the compartment, a door or a cover portion facing the outside of the switchgear, and the like can be reduced. Therefore, manufacture cost of the switchgear can be reduced.

DESCRIPTION OF EMBODIMENTS

Embodiment 1

Figure 1:
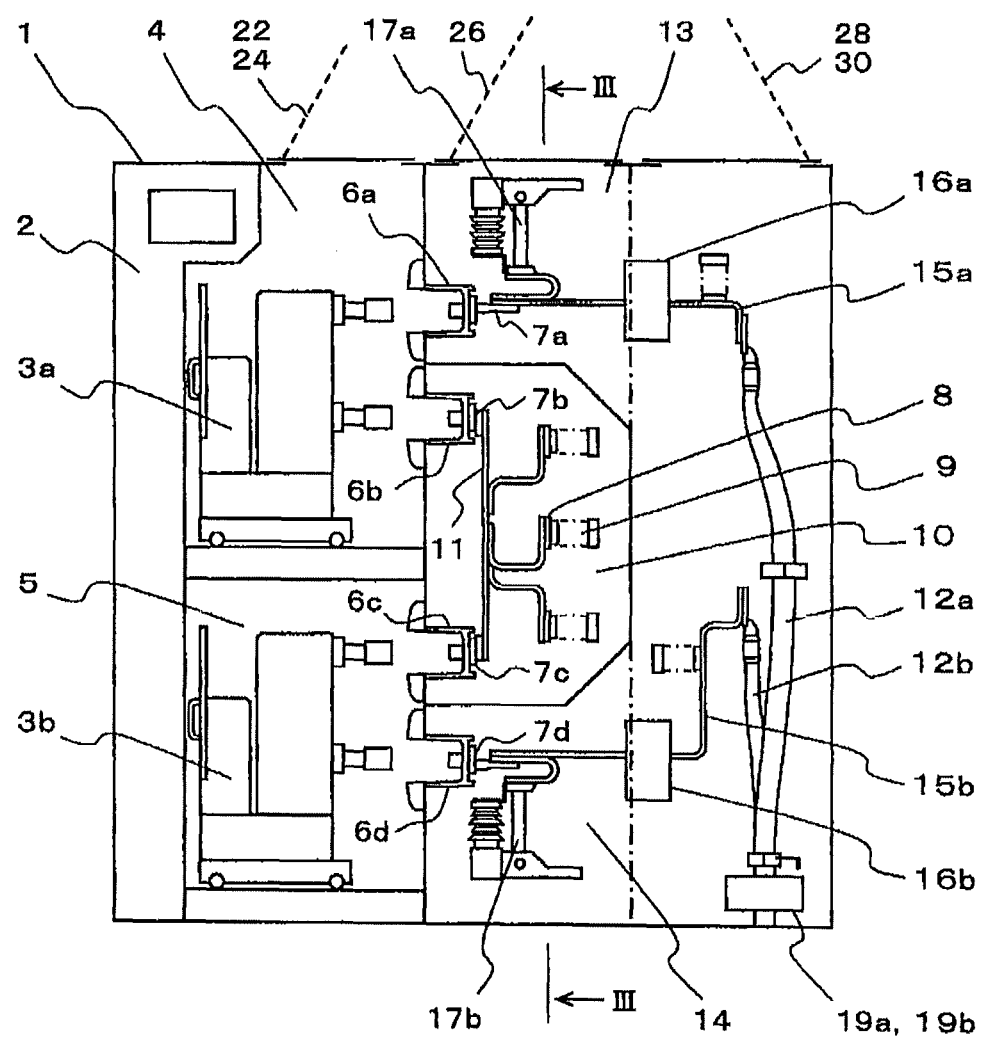
FIG. 1 is a side sectional view of a switchgear according to embodiment 1 of the present invention.
Figure 2:
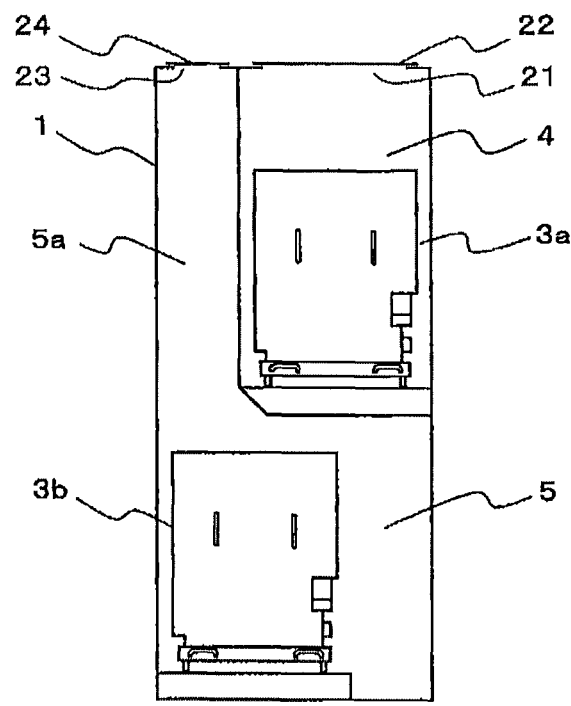
FIG. 2 is a view of breaker compartments at the upper and lower stages as seen from the front side in FIG. 1.
Figure 3:
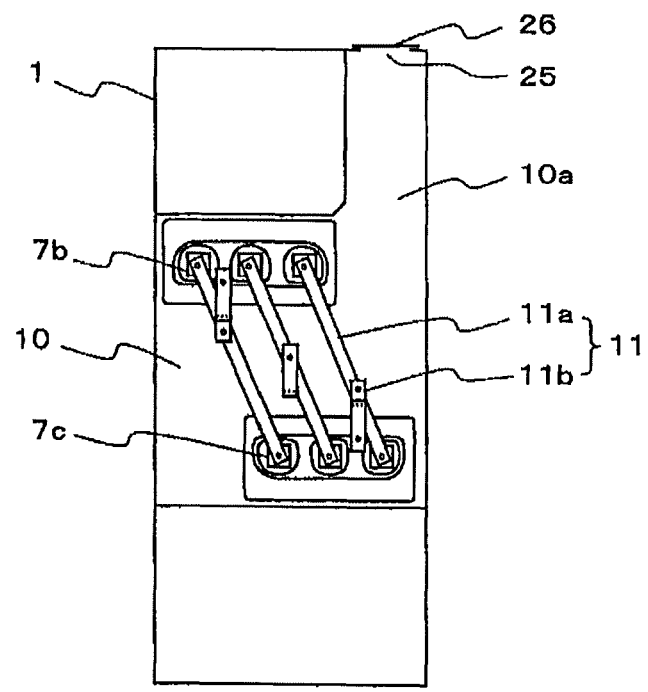
FIG. 3 is a view of a bus compartment as seen from arrows III-III in FIG. 1.
Figure 4:
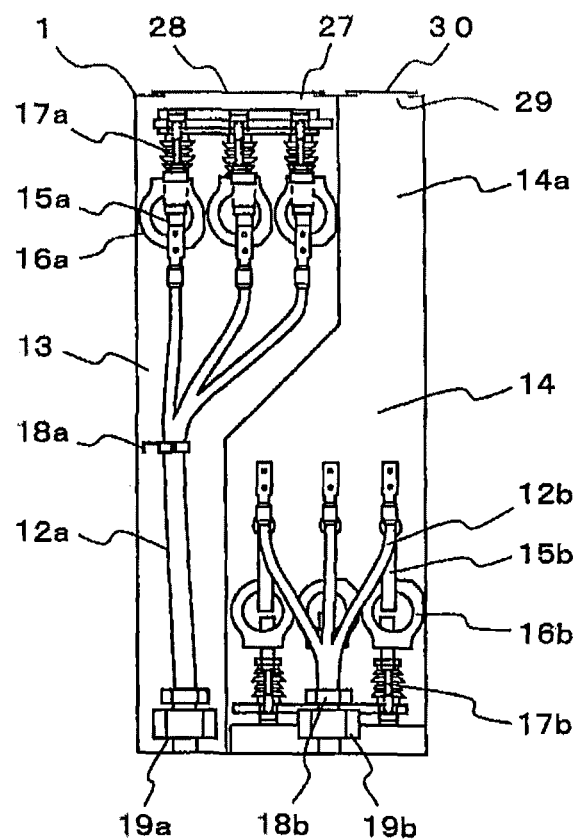
FIG. 4 is a view of a cable compartment as seen from the back side in FIG. 1.
Figure 5:
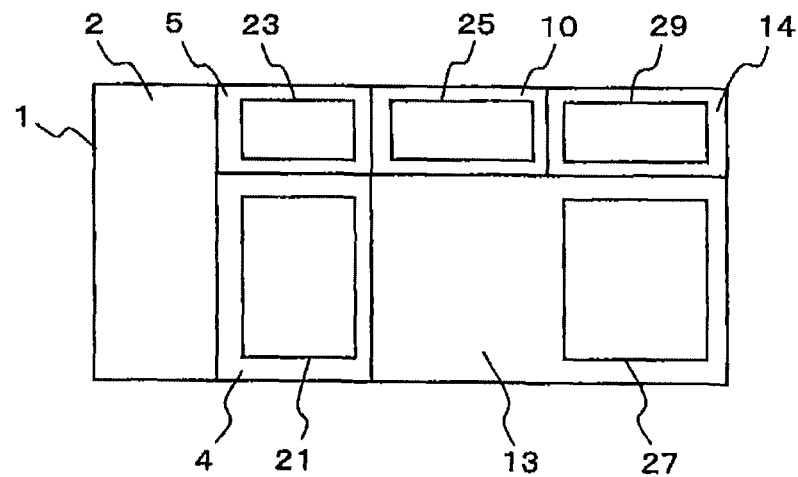
FIG. 5 is a plane view of FIG. 1.

FIG. 1 is a side sectional view of a switchgear according to embodiment 1. FIG. 2 is a view of the inside of a breaker compartment as seen from the front side. FIG. 3 is a view of a bus compartment as seen from arrows III-III in FIG. 1. FIG. 4 is a view of the inside of a cable compartment as seen from the back side. FIG. 5 is a plane view of FIG. 1.

First, with reference to FIG. 1, the internal configuration of the switchgear will be described. As shown in FIG. 1, the inside of a housing 1 of the switchgear, made of grounded metal, is partitioned by partition plates into a plurality of compartments. The compartments respectively contain a bus and apparatuses forming a branch circuit having two or more lines branching from the bus. In the present embodiment, the switchgear including two lines of branch circuits each having a breaker and a cable connected to the breaker as the apparatuses forming the branch circuit, will be described as an example.

A control apparatus compartment 2 containing a control apparatus (not shown) is placed directly in back of a door (not shown) on the front side (the left side in FIG. 1 is defined as the front side). Further, in back thereof, an upper-stage breaker compartment 4 containing a withdrawable breaker 3a is placed on the upper side, and a lower-stage breaker compartment 5 also containing a withdrawable breaker 3b is placed on the lower side.

The breaker 3a at the upper stage and the breaker 3b at the lower stage are placed being displaced from each other in the direction perpendicular to the sheet plane of FIG. 1, and the details thereof will be described later.

The breakers 3a and 3b are withdrawable from the front side. In the back walls of the upper-stage breaker compartment 4 and the lower-stage breaker compartment 5, main circuit disconnection portions 6a and 6b, and 6c and 6d are formed through the walls at predetermined intervals in the vertical direction, and are attachable and detachable with upper and lower connection terminals projecting on the back surfaces of the breakers 3a and 3b. The main circuit disconnection portions 6a to 6d have disconnection terminals 7a to 7d, respectively. FIG. 1 shows the state where the breakers 3a and 3b are slightly withdrawn forward being detached from the main circuit disconnection portions.

In back of the breaker compartments 4 and 5 at both stages, at the center of the housing 1 in the vertical direction, a bus compartment 10 is placed which contains three-phase buses 8 supported by support insulators 9. In the bus compartment 10, the disconnection terminal 7b of the main circuit disconnection portion 6b connected to one of the connection terminals of the breaker 3a at the upper stage, and the disconnection terminal 7c of the main circuit disconnection portion 6c connected to one of the connection terminals of the breaker 3b at the lower stage, are connected by a branch conductor 11, and the branch conductor 11 is connected to the bus 8.

On the upper side in back of the bus compartment 10, an upper-stage cable compartment 13 is placed which contains a load-side cable 12a connected to the disconnection terminal 7a of the main circuit disconnection portion 6a connected to the other of the connection terminals of the breaker 3a at the upper stage. On the lower side in back of the bus compartment 10, a lower-stage cable compartment 14 is placed which contains a load-side cable 12b connected to the disconnection terminal 7d of the main circuit disconnection portion 6d connected to the other of the connection terminals of the breaker 3b at the lower stage. The cable compartments 13 and 14 are placed being displaced from each other in the direction perpendicular to the sheet plane of FIG. 1, and the details of their shapes and internal configurations will be described later.

As described above, the above compartments contain apparatuses forming two lines of: the branch circuit at the upper stage starting from the bus 8, passing through the upper-stage breaker 3a, connected to the upper-stage cable 12a, and then introduced to an external load; and the branch circuit at the lower stage starting from the bus 8, passing through the lower-stage breaker 3b, connected to the cable 12b, and then introduced to the external load.

It is noted that the internal structure of the housing 1 shown in FIG. 1 is merely an example, and the housing 1 is not limited to the placement configuration in FIG. 1. Normally, a compartment containing a withdrawable apparatus, a bus compartment, a cable compartment, and a control apparatus compartment are provided. However, a cable compartment may not be provided, or other configurations may be employed.

Next, the details of each compartment will be described.

FIG. 2 is a view of the insides of the upper-stage breaker compartment 4 and the lower-stage breaker compartment 5 as seen from the front side, and shows the placement relationship between both breaker compartments 4 and 5. The breaker 3a and the breaker 3b are placed in the breaker compartments 4 and 5 at the upper stage and the lower stage, respectively. As shown in FIG. 2, the breaker 3a at the upper stage is placed with its center being displaced to the right as seen from the front side, and the breaker 3b at the lower stage is placed with its center being displaced to the left as seen from the front side. It is noted that the placements of the breakers 3a and 3b in the right-left direction may be reversed (left for upper stage and right for lower stage).

Since both breakers 3a and 3b are displaced to the right and the left, a space formed above the breaker 3b at the lower stage between the left wall of the upper-stage breaker compartment 4 and the left wall of the housing 1 is utilized as a part of the lower-stage breaker compartment 5. In the lower-stage breaker compartment 5, this part is secured as a pressure discharge path 5a directly leading to the ceiling of the housing 1.

Figure 6:
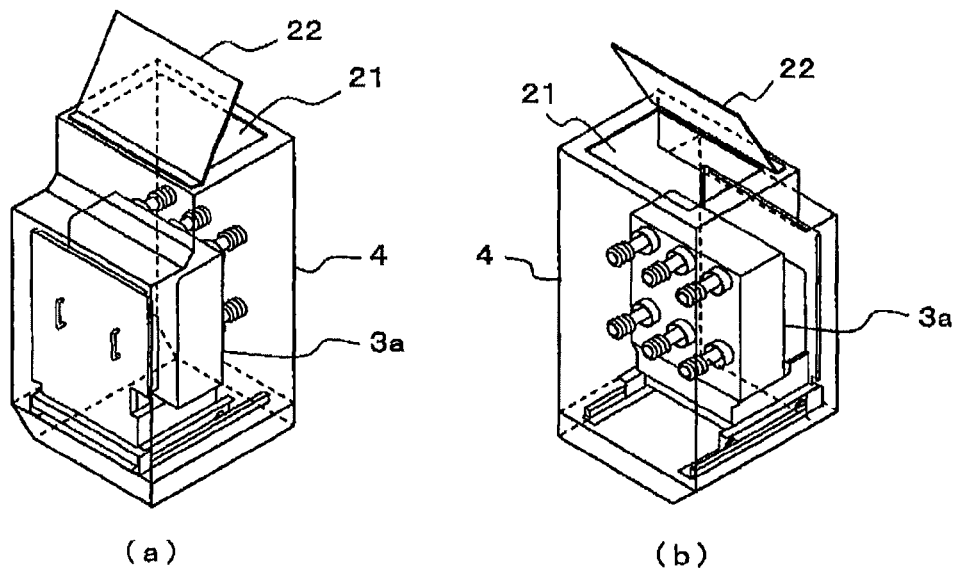
FIG. 6 is a perspective view of the upper-stage breaker compartment in FIG. 1.

FIG. 6 is a perspective view showing only the upper-stage breaker compartment 4, in which a diagram (a) is a view as seen from the upper right on the front side and a diagram (b) is a view as seen from the upper right on the back side. Internal contained apparatuses are shown so as to be seen through. It is noted that the same showing method and the same viewing direction are also applied to perspective views shown below.

A ceiling portion of the upper-stage breaker compartment 4 also serves as the ceiling of the housing 1. On the ceiling portion, an opening portion 21 is formed, and a pressure discharge plate 22 is provided so as to cover the opening portion 21. In FIG. 6, the pressure discharge plate 22 drawn by a solid line is in an opened state after the internal short-circuit accident (the same applies to perspective views shown below). In a normal state, the opening portion 21 is closed as shown in FIG. 2.

It is noted that the pressure discharge plate 22 may be provided with a ventilation hole, a filter, and the like to have a ventilation function (the same applies to each pressure discharge plate described below). Thus, upon normal operation of the switchgear, heat generated in each compartment can be easily released from its own compartment ceiling portion to outside. Therefore, a heat release measure for the internal temperature increase in the switchgear can be conducted with low cost.

In addition, instead of a pressure discharge plate, a pressure discharge tower or the like may be provided. In the following description, a pressure discharge plate is employed as a representative.

Figure 7:
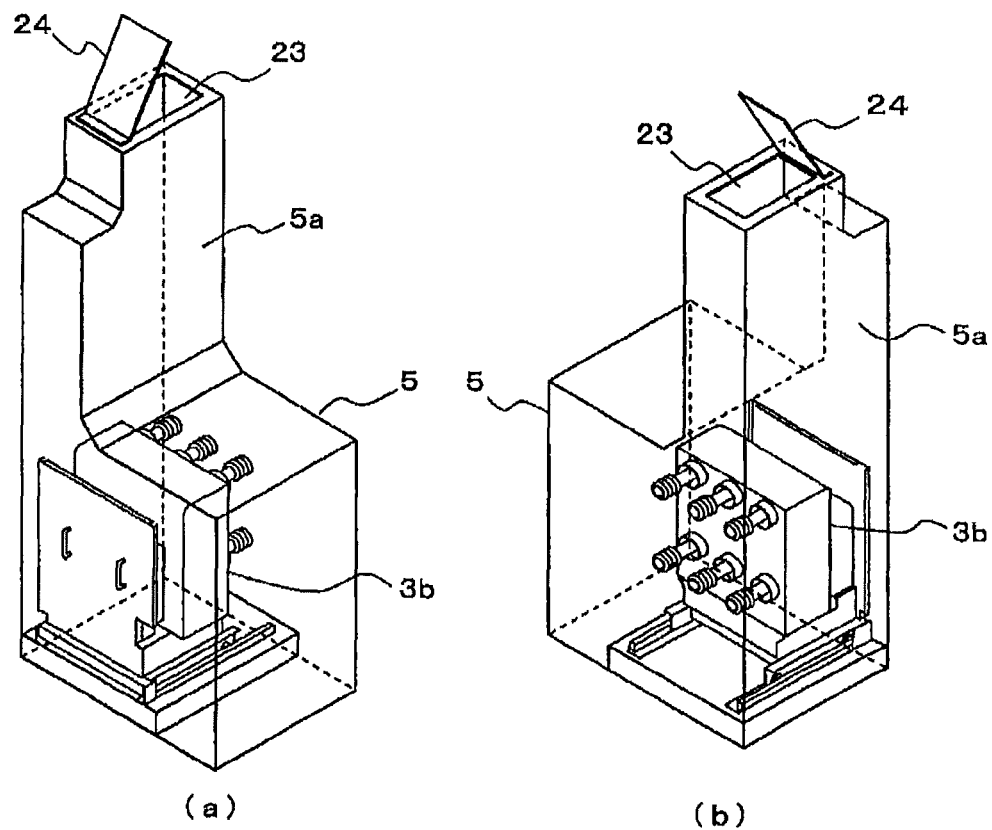
FIG. 7 is a perspective view of the lower-stage breaker compartment in FIG. 1.

FIG. 7 is a perspective view showing only the lower-stage breaker compartment 5, in which a diagram (a) is a view as seen from the front side and a diagram (b) is a view as seen from the back side.

The upper-stage breaker compartment 4 shown in FIG. 6 is placed above the lower-stage breaker compartment 5, whereby the upper and lower breaker compartments are formed.

As described above, the pressure discharge path 5a directly leads to the ceiling portion of the housing 1, and the upper surface of the pressure discharge path 5a also serves as the ceiling of the housing 1. An opening portion 23 for pressure discharge and heat release is formed on the upper surface, and a pressure discharge plate 24 is provided so as to cover the opening portion 23.

For convenience, the opening portion 23 shown in FIG. 7 is drawn to have an area smaller than that of the opening portion 21 shown in FIG. 6. However, the area of each opening portion of the ceiling portion is determined mainly by arc energy upon an internal short-circuit accident, the volume of a compartment, and allowable pressure.

In addition, since the sectional area of the pressure discharge path 5a of the lower-stage breaker compartment 5 is also determined by arc energy upon an internal short-circuit accident, and the like, the minimum necessary dimension may be employed. Then, depending on this dimension, a dimension by which the breakers 3a and 3b at the upper stage and the lower stage can be displaced in the width direction of the housing 1, is determined.

In each of the breaker compartments 4 and 5, at a portion where the sectional area changes in the pressure discharge path from the internal apparatus containing portion to the opening portion, a slope at an angle of, for example, about 45 degrees is provided on the wall surface of the compartment to prevent sharp change, so that the sectional area gradually changes. Thus, the fluid resistance upon pressure discharge when a short-circuit accident or the like occurs inside the lower-stage breaker compartment 5 can be reduced. Therefore, it becomes possible to reduce the sectional area needed for the pressure discharge path.

It is noted that also in other compartments described below, the wall surfaces at portions where the sectional area changes in the pressure discharge path have shapes in which the sectional area gradually changes by providing slopes on the wall surfaces as described above. The description thereof is omitted by referring to the drawings.

Next, the bus compartment 10 will be described.

FIG. 3 is a view showing a part corresponding to the bus compartment 10 as seen from the direction of arrows III-III in FIG. 1. Parts other than the specific part are not shown. The upper-stage breaker compartment 4 is placed at the right as seen from the front side as described above, and accordingly, the upper-stage cable compartment 13 is also placed at the right. Therefore, a space formed at the left (in FIG. 3, a space at the right because the view is seen from the back) is utilized as a pressure discharge path 10a of the bus compartment 10. The pressure discharge path 10a directly leads to the ceiling of the housing 1, and the upper portion of the pressure discharge path 10a also serves as the ceiling of the housing 1. A pressure discharge plate 26 is provided on an opening portion 25 formed on the ceiling. It is noted that the placement and the shape of the pressure discharge path 10a are changed depending on the placements of the breaker compartments 4 and 5.

Figure 8:
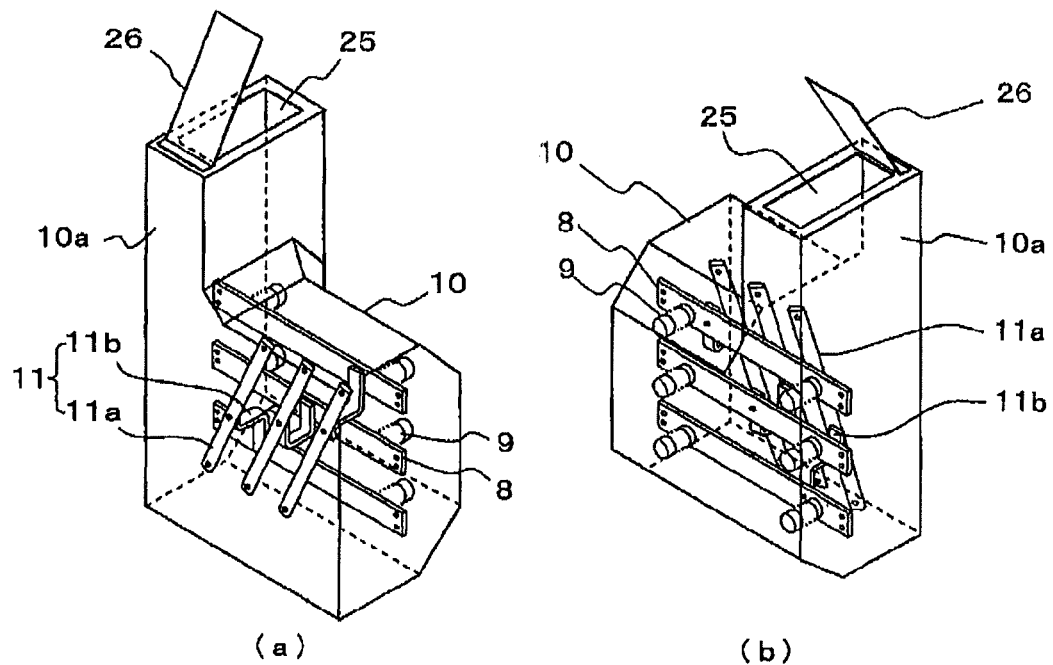
FIG. 8 is a perspective view of the bus compartment in FIG. 1.

FIG. 8 is a perspective view showing only the bus compartment 10, in which a diagram (a) is a view as seen from the front side and a diagram (b) is a view as seen from the back side.

As shown in FIGS. 3 and 8, the branch conductor 11 connecting the disconnection terminals 7b and 7c and the bus 8 is composed of a straight branch conductor 11a connecting the disconnection terminals 7b and 7c, and a branch conductor 11b connecting the branch conductor 11a and the bus 8. Thus, by connecting the fixed disconnection terminals 7b and 7c by the branch conductor 11a which is a straight conductor, the resistance to force applied to the branch conductor 11a can be increased. As a result, the number of the support insulators 9 (see FIG. 8) supporting the buses 8 can be reduced.

Next, the upper-stage cable compartment 13 and the lower-stage cable compartment 14 will be described.

FIG. 4 is a view showing the placements of the cable compartments 13 and 14 as seen from the back side in FIG. 1. In FIG. 4, the upper-stage cable compartment 13 is placed at the left, and the lower-stage cable compartment 14 is placed at the right. However, since the placements of the cable compartments depend on the placements of the breakers 3a and 3b, the placements and the shapes of the cable compartments 13 and 14 can change depending on the placements of the breaker compartments 4 and 5.

Figure 9:
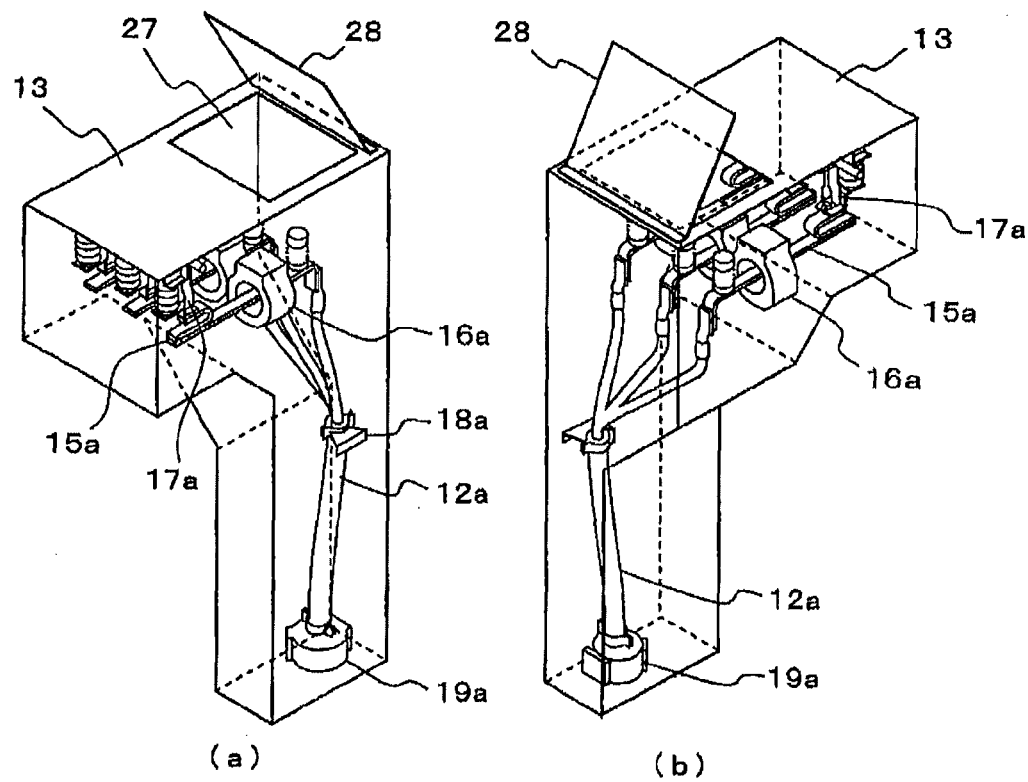
FIG. 9 is a perspective view of the upper-stage cable compartment in FIG. 1.
Figure 10:
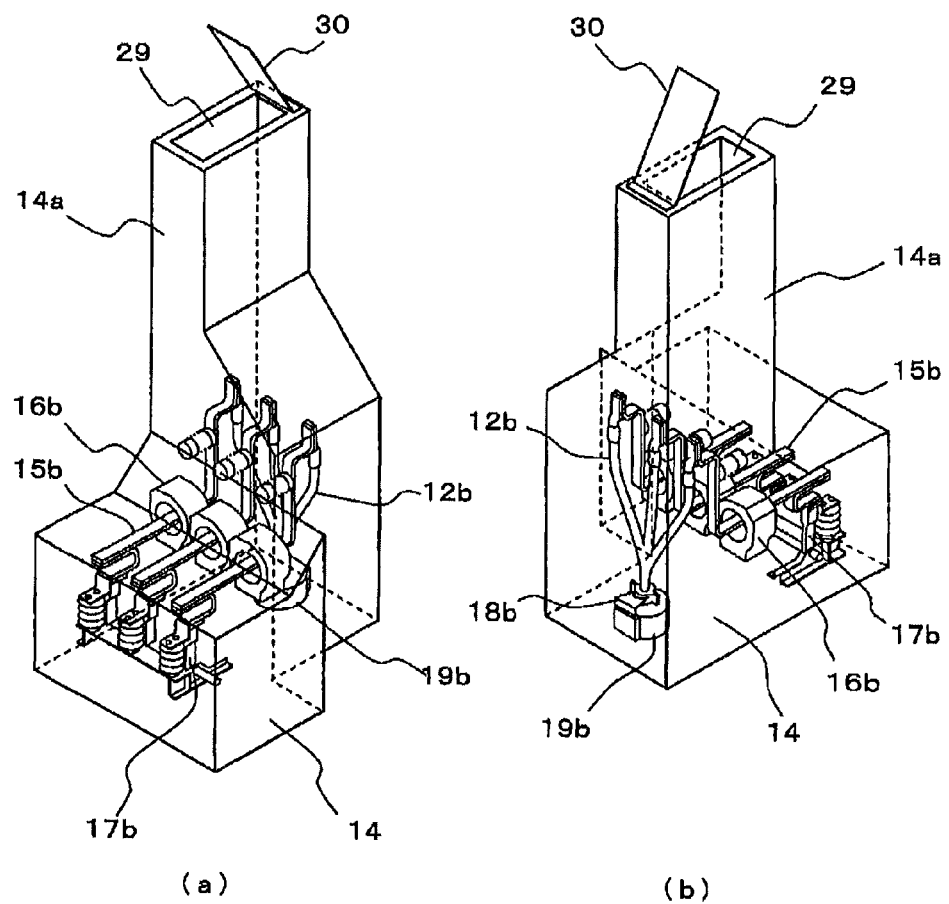
FIG. 10 is a perspective view of the lower-stage cable compartment in FIG. 1.

FIG. 9 is a perspective view showing only the upper-stage cable compartment 13. FIG. 10 is a perspective view showing only the lower-stage cable compartment 14. In each of FIGS. 9 and 10, a diagram (a) is a view as seen from the front side and a diagram (b) is a view as seen from the back side.

With reference to FIGS. 4 and 9, first, the upper-stage cable compartment 13 will be described.

Since the upper-stage breaker compartment 4 is placed at the right as seen from the front side of the switchgear, the corresponding upper-stage cable compartment 13 is also placed at the right as seen from the front side (as shown in FIG. 4, at the left as seen from the back side).

The disconnection terminal 7a and the cable 12a are connected via a connection conductor 15a, and a current transformer 16a is provided for the connection conductor 15a which passes through the current transformer 16a. In addition, a ground switch 17a is connected to the disconnection terminal 7a.

The ceiling of the upper-stage cable compartment 13 also serves as the ceiling of the housing 1, an opening portion 27 is formed on the ceiling, and a pressure discharge plate 28 is provided so as to cover the opening portion 27.

The cable 12a is fixed by a support metal member 18a provided between the cable lead-in portion and the cable terminal, with the cable surface being grounded by the support metal member 18a. The cable 12a at its lower end penetrates through a zero-phase current transformer 19a, and then leads to the outside of the switchgear, to be connected to another power apparatus.

In a region lower than the support metal member 18a, the surface of the cable 12a is grounded and therefore it is not necessary to secure an insulation distance between the cable surface and the side wall of the compartment made of grounded metal. Therefore, a space needed for providing the cable is small. Therefore, in the cable compartment 13, on the upper side of the switchgear, a space needed with respect to the width direction for containing the connection conductor 15a, the current transformer 16a, the ground switch 17a, and the like described above is secured, and on the lower side, the space is reduced in the width direction in accordance with the cable distribution. In a region lower than the support metal member 18, the cable compartment 13 has the minimum necessary space with respect to the width direction.

Next, with reference to FIGS. 4 and 10, the lower-stage cable compartment 14 will be described.

As in the upper stage side, the disconnection terminal 7b and the cable 12b are connected via a connection conductor 15b, and a current transformer 16b is provided for the connection conductor 15b which passes through the current transformer 16b. In addition, a ground switch 17b is connected to the disconnection terminal 7d.

The cable 12b is fixed by a support metal member 18b provided thereon, with the cable surface being grounded by the support metal member 18b. The cable 12b at its lower end penetrates through a zero-phase current transformer 19b, and then the subsequent cable leads to the outside of the switchgear, to be connected to another power apparatus.

As shown in FIGS. 4 and 10, on the lower side, the space is maximized with respect to the width direction, for containing the connection conductor 15b, the current transformer 16b, the ground switch 17b, and the like described above. The shape of the connection conductor 15b is vertically elongated as much as possible in order to secure the length for terminal treatment for the cable 12b.

As seen from the direction of FIG. 4, a space formed between the upper-side right wall of the upper-stage cable compartment 13 and the right wall of the housing 1 is a pressure discharge path 14a of the lower-stage cable compartment 14. The ceiling side of the pressure discharge path 14a also serves as the ceiling of the housing 1, an opening portion 29 is formed thereon, and a pressure discharge plate 30 is provided so as to cover the opening portion 29. As described above, at a portion where the sectional area of the pressure discharge path reduces, a sloping surface is provided so as to gradually change the sectional area. By thus designing the compartment, the fluid resistance upon pressure discharge can be suppressed, and therefore it becomes possible to reduce the sectional area needed for the pressure discharge path.

FIG. 5 is a plane view of FIG. 1 and shows the ceiling portion. The pressure discharge plates are not shown. As seen from the front side (the left side in FIG. 5), the control apparatus compartment 2 is located first, the upper-stage breaker compartment 4 having the opening portion 21 at the right and the lower-stage breaker compartment 5 having the opening portion 23 at the left are located in back of the control apparatus compartment 2, the upper-stage cable compartment 13 having the opening portion 27 is located in back of the upper-stage breaker compartment 4, the bus compartment 10 having the opening portion 25 is located in back of the lower-stage breaker compartment 5, and then the lower-stage cable compartment 14 having the opening portion 29 is located in back of the bus compartment 10.

The breaker compartments 4 and 5, the bus compartment 10, and the cable compartments 13 and 14 are partitioned from each other so as to divide the ceiling of the switchgear in the width direction and the depth direction.

As described above, the feature of the present application is that all the compartments containing the main circuit apparatuses, except the control apparatus compartment 2, each directly lead to the ceiling of the housing 1 and have an opening portion at the ceiling, and a pressure discharge plate is provided on each opening portion.

By displacing the apparatuses at the upper stage and the lower stage from each other in the right-left direction, a space formed between the side wall of the upper-stage apparatus compartment and the wall surface of the housing is utilized as the pressure discharge path of the lower-stage apparatus compartment. Therefore, a pressure discharge path can be secured without increasing the dimension of the switchgear more than necessary.

In a normal operation state, the pressure discharge plates 22, 24, 26, 28, and 30 are closed as shown by solid lines in FIG. 1. If an accident should occur inside the housing of the switchgear, the corresponding pressure discharge plate is opened by high-pressure and high-temperature gas due to the accident, that is, the pressure discharge plate of the compartment in which the accident has occurred becomes the state shown by a dashed line, whereby the internal pressure and the high-temperature gas are discharged.

In the above description, the case where the cable on the load side is led in from the floor surface side of the housing as shown in FIG. 1 has been described. Next, modifications of the configuration in FIG. 1 will be described.

Figure 11:
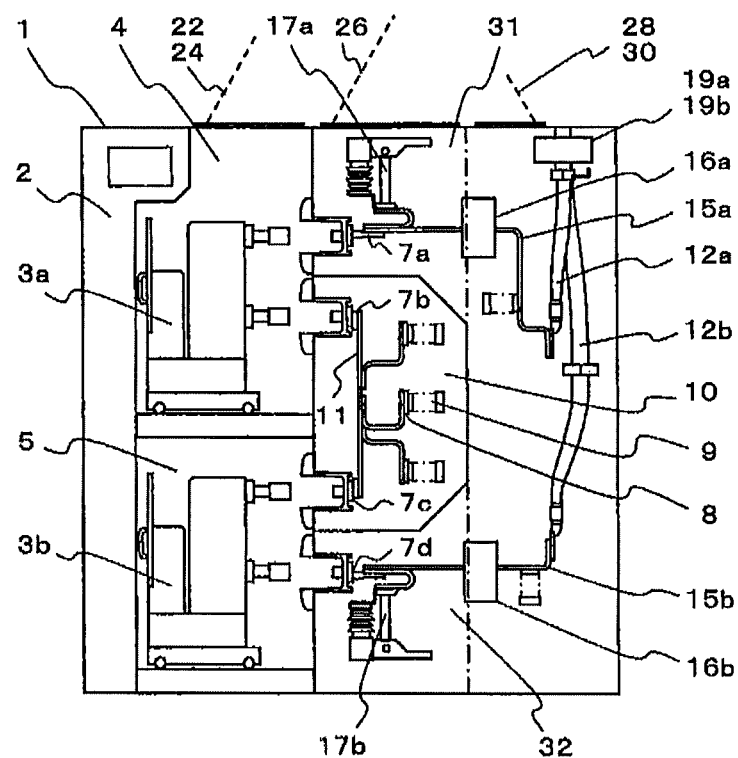
FIG. 11 is a side sectional view showing another example of the switchgear according to embodiment 1 of the present invention.
Figure 12:
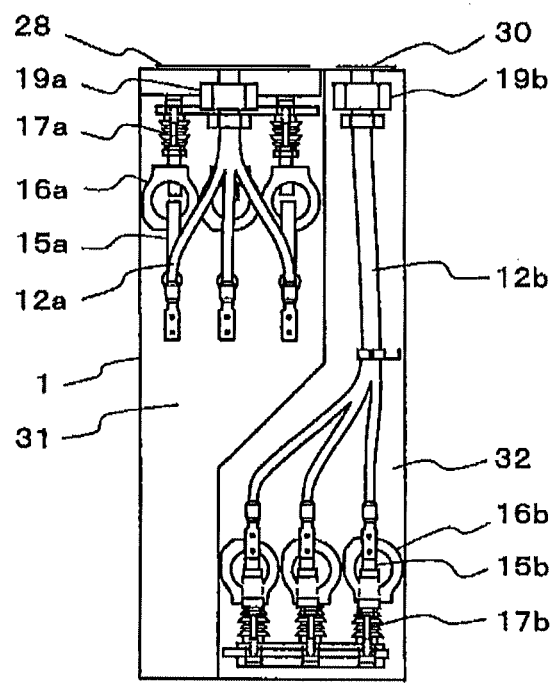
FIG. 12 is a view of a cable compartment as seen from the back side in FIG. 11.

FIG. 11 is a side sectional view showing a modification of the switchgear shown in FIG. 1. FIG. 12 is a sectional view of a cable compartment as seen from the back side. Components equivalent to those in FIG. 1 are denoted by the same reference characters, and the description thereof is omitted.

The difference is that the lead-in side of the cable is changed to the ceiling side of the switchgear. The cables 12a and 12b respectively contained in an upper-stage cable compartment 31 and a lower-stage cable compartment 32 are led in from the ceiling side. Also in this case, as in the case of FIG. 1, the two breakers 3a and 3b are respectively placed at an upper right portion and a lower left portion of the switchgear or at an upper left portion and a lower right portion of the switchgear, whereby all the compartments containing the main circuit apparatuses can have opening portions directly leading to ceiling portions of the switchgear.

Next, another modification will be described.

Figure 13:
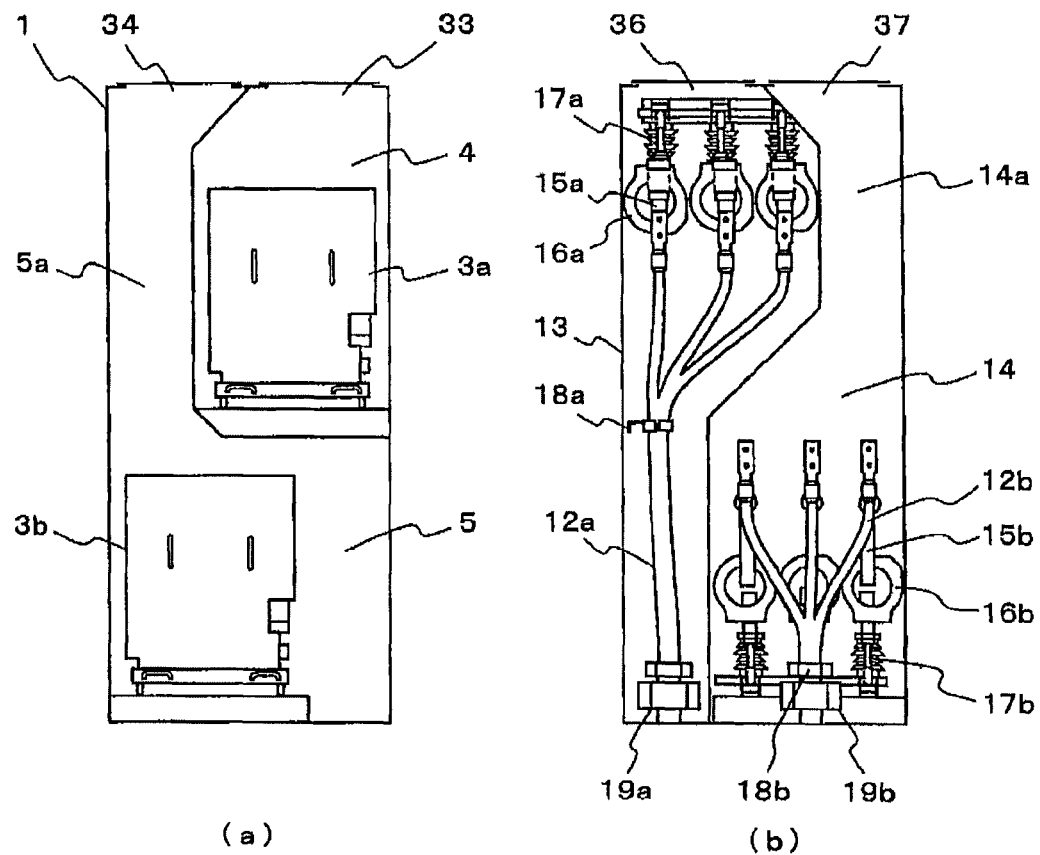
FIG. 13 is a front sectional view and a back sectional view showing another example of the switchgear according to embodiment 1 of the present invention.
Figure 14:
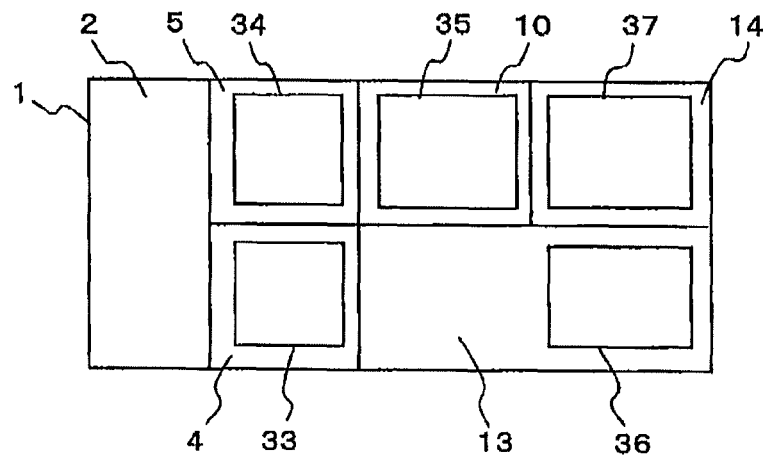
FIG. 14 is a plane view of FIG. 13.

FIG. 13(a) is a view of the inside of a breaker compartment as seen from the front side, and FIG. 13(b) is a view of the inside of a cable compartment as seen from the back side, respectively corresponding to FIG. 2 and FIG. 4. In addition, FIG. 14 is a plane view, corresponding to FIG. 5. It is noted that a side view is equivalent to FIG. 1. Components equivalent to those in FIGS. 1, 2, 4, and 5 are denoted by the same reference characters, and the description thereof is omitted. Only the difference will be described.

The difference is that the difference in size among the opening areas of opening portions formed on the ceiling portion is reduced. To achieve this, in the pressure discharge path leading to the ceiling of the compartment at the lower stage or the middle stage, the side wall in the vicinity of the opening portion on the ceiling is sloped so as to expand the opening portion.

The larger the opening area on the ceiling portion is, the more the high-pressure and high-temperature gas generated upon internal short-circuit is discharged to the outside of the switchgear. Therefore, increase in the internal pressure can be suppressed.

Accordingly, as shown in FIG. 13(a), in the vicinity of the ceiling of the lower-stage breaker compartment 5, the upper portion of the right side wall of the pressure discharge path 5a is sloped obliquely upward, so that an opening portion 34 is enlarged as compared to FIG. 2. Similarly, as shown in FIG. 13(b), in the vicinity of the ceiling of the lower-stage cable compartment 14, the side wall of the pressure discharge path 14a is sloped obliquely upward, so that an opening portion 37 is enlarged as compared to FIG. 4. In addition, although not shown, an opening portion 35 in the vicinity of the ceiling of the bus compartment 10 is also enlarged in the same manner.

Along with this, as shown in FIG. 14, an opening portion 33 of the upper-stage breaker compartment 4 and an opening portion 36 of the upper-stage cable compartment 13 are reduced as compared to FIG. 5. A portion where the sectional area changes in the pressure discharge path is formed to be sloped with respect to the flowing path of pressure discharge, as in the above-described case.

Owing to this configuration, suppression of internal pressure increase can be effectively realized in an apparatus compartment placed at the lower stage at which it is more difficult to suppress the internal pressure increase upon an internal short-circuit accident than that at the upper stage.

In addition, in the case where arc energy upon an internal short-circuit accident is large and therefore the area of an opening portion on the ceiling portion needs to be increased, since the difference in size among opening areas can be reduced while the space of the ceiling is effectively utilized, enlargement of the housing dimension of the switchgear can be suppressed.

Still another modification will be described.

Figure 15:
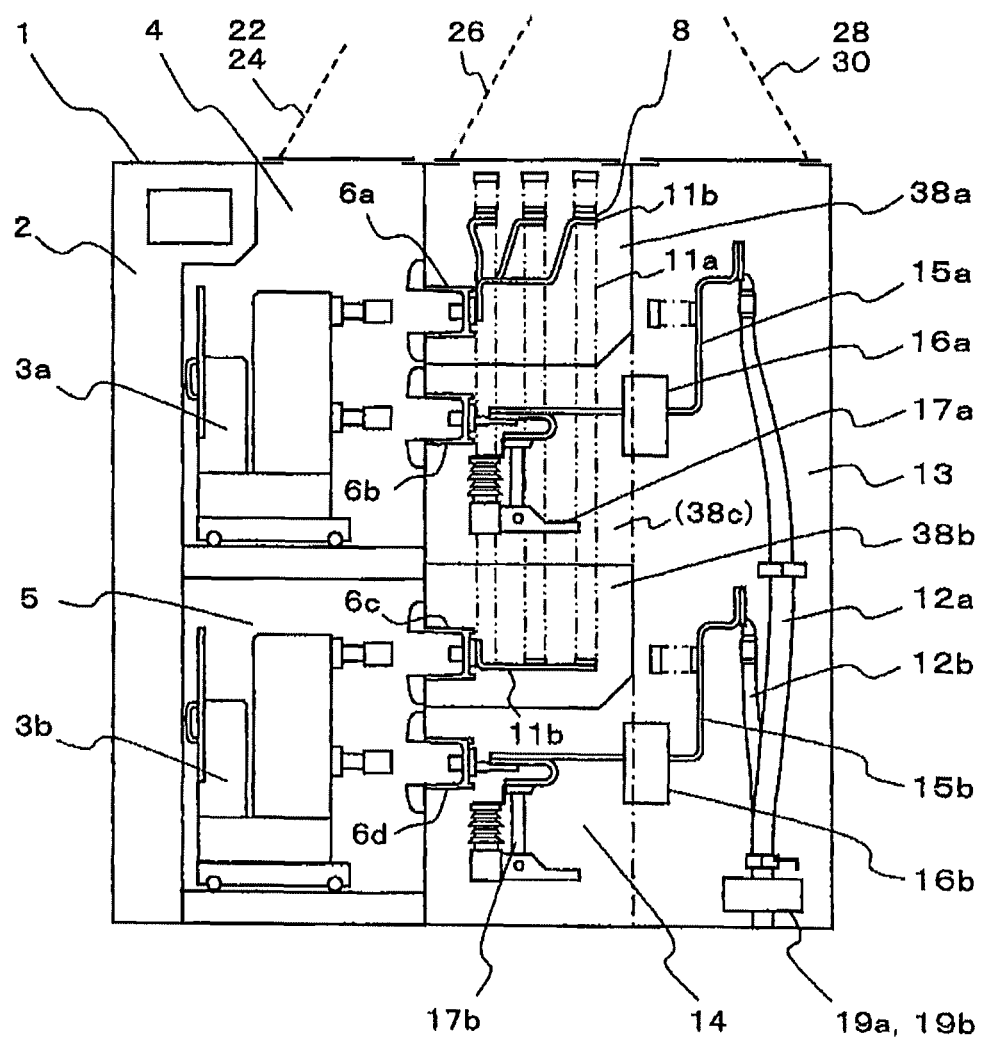
FIG. 15 is a side sectional view showing still another example of the switchgear according to embodiment 1 of the present invention.

FIG. 15 is a view corresponding to FIG. 1. Components equivalent to those in FIG. 1 are denoted by the same reference characters, and the description thereof is omitted. Only the difference will be described.

In the case of FIG. 1, the bus compartment is placed at the center of the housing 1 with respect to the vertical direction, and the three-phase buses are arranged in the vertical direction. On the other hand, in the case of FIG. 15, the buses 8 are arranged in the horizontal direction, that is, in the front-back direction, on the upper side of the back of each of the upper-stage and lower-stage breaker compartments 4 and 5.

A bus compartment 38 is composed of an upper-side bus compartment portion 38a, a lower-side bus compartment portion 38b, and a pressure discharge path portion 38c connecting the upper and lower bus compartment portions 38a and 38b and also serving as a pressure discharge path.

The cable 12a in the upper-stage cable compartment 13 is connected to the main circuit disconnection portion 6b via the connection conductor 15a, and the ground switch 17a is connected at the connection portion. As seen from the direction of this figure, the pressure discharge path portion 38c of the bus compartment 38 is placed in back of the upper-stage cable compartment 13 (at the position corresponding to the pressure discharge path 10a in FIG. 8) although not shown.

The upper-side bus compartment portion 38a contains the branch conductor 11b connected to the bus 8 and the main circuit disconnection portion 6a, the lower-side bus compartment portion 38b contains the branch conductor 11b connected to the main circuit disconnection portion 6c, and the pressure discharge path portion 38c contains the branch conductor 11a connecting the main circuit disconnection portions 6a and 6c.

This configuration also obtains the same operational effect as in the case of FIG. 1.

In the above description, the case where the bus and the apparatuses forming the two lines of branch circuits branching from the bus are contained in the respective compartments has been described. Instead, for example, three lines may be provided. In an example of the three-line case, with reference to the front view shown in FIG. 2, a breaker for the third line may be placed being displaced in the lower-right direction from the breaker 3a at the upper stage. Thus, a space formed in the housing width direction by displacing the upper stage and the lower stage from each other in the housing width direction can be utilized as the pressure discharge path of the lower-stage compartment.

As described above, in the switchgear according to embodiment 1, the inside of a housing is partitioned into a plurality of compartments, and a bus and apparatuses forming two or more lines of branch circuits branching from the bus are respectively contained in the plurality of compartments. The apparatuses forming the branch circuits are placed at an upper stage and a lower stage in the housing and are displaced from each other in the right-left direction. Spaces formed between a side wall of the housing and side walls of upper-stage apparatus compartments containing the apparatuses placed at the upper stage, are used as paths leading to a housing ceiling for a bus compartment containing the bus and lower-stage apparatus compartments containing the apparatuses placed at the lower stage. The bus compartment and all the apparatus compartments are each individually connected directly to a ceiling portion of the housing and have an opening portion on the ceiling portion, which opens to the outside. Therefore, when high-pressure and high-temperature gas generated due to a short-circuit accident or the like inside the housing of the switchgear is discharged, the pressure can be directly discharged from the corresponding compartment through the opening portion provided on the ceiling portion above the compartment. Thus, increase in the internal pressure can be efficiently suppressed.

In addition, reinforcements for the wall surface of the compartment, a door or a cover portion facing the outside of the switchgear, and the like can be reduced. Therefore, manufacture cost of the switchgear can be reduced.

In addition, the apparatuses forming the branch circuits at least have a breaker and a cable connected to the breaker for each branch circuit. The breakers are respectively contained in breaker compartments at the upper stage and the lower stage placed in front of the bus compartment. The cables are respectively contained in cable compartments at the upper stage and the lower stage placed in back of the bus compartment. Therefore, in either case where the cables are led in on the floor side or the ceiling side of the housing, the opening portions of the compartments can be easily formed on the ceiling side, and the above-described effect can be obtained.

In addition, the cable contained in each cable compartment has, between a cable lead-in portion and a cable terminal, at least one portion supported by a support metal member on a wall surface of the cable compartment, whereby the outer surface of the cable is grounded. Therefore, in a region lower than the grounded portion, it is not necessary to secure an insulation distance between the cable and the compartment side wall. Therefore, a space needed for placement of the cable is small, and the size of the switchgear can be reduced.

Further, at a portion where the sectional area changes in a pressure discharge path leading from the inside of each compartment to the corresponding opening portion, a wall surface of the compartment has a slope such that the sectional area gradually changes. Therefore, fluid resistance upon pressure discharge when a short-circuit accident or the like has occurred inside the compartment can be reduced, and the sectional area needed for the pressure discharge path can be reduced. Therefore, the size of the switchgear can be reduced.

DESCRIPTION OF THE REFERENCE CHARACTERS 1 housing
2 control apparatus compartment
3a, 3b breaker
4 upper-stage breaker compartment
5 lower-stage breaker compartment
5a pressure discharge path
6a to 6d main circuit disconnection portion
7a to 7d disconnection terminal
8 bus
9 support insulator
10 bus compartment
10a pressure discharge path
11, 11a, 11b branch conductor
12a, 12b cable
13 upper-stage cable compartment
14 lower-stage cable compartment
14a pressure discharge path
15a, 15b connection conductor
16a, 16b current transformer
17a, 17b ground switch
18a, 18b support metal member
19a, 19b zero-phase current transformer
21, 23, 25, 27, 29 opening portion
22, 24, 26, 28, 30 pressure discharge plate
31 upper-stage cable compartment
32 lower-stage cable compartment
33 to 37 opening portion
38 bus compartment
38a upper-side bus compartment portion
38b lower-side bus compartment portion
38c pressure discharge path

The invention claimed is:

1. A switchgear in which the inside of a housing is partitioned into a plurality of compartments, the plurality of compartments including a bus compartment and apparatus compartments, and a bus and apparatuses forming two or more lines of branch circuits branching from the bus are respectively contained in the bus compartment and the apparatus compartments, wherein the apparatuses forming the branch circuits are placed at an upper stage and a lower stage in the housing and are displaced from each other in the right-left direction, spaces formed between a side wall of the housing and side walls of upper-stage apparatus compartments of the apparatus compartments containing the apparatuses placed at the upper stage, are used as paths leading to a housing ceiling for lower-stage apparatus compartments of the apparatus compartments containing the apparatuses placed at the lower stage, the bus compartment containing the bus and all the apparatus compartments are each individually connected directly to a ceiling portion of the housing and each have an opening portion on the ceiling portion, which opens to an outside of the housing, the apparatuses forming a lower branch circuit of the branch circuits at the lower stage are placed directly under the opening portion of each of the lower-stage apparatus compartments, the apparatuses forming each branch circuit are at least a breaker and a cable connected to the breaker for each branch circuit, each breaker is respectively contained in a respective breaker compartment of the apparatus compartments at the upper stage and the lower stage placed in front of the bus compartment, each cable is respectively contained in a respective cable compartment of the apparatus compartments at the upper stage and the lower stage placed in back of the bus compartment, and the cable contained in each cable compartment has at least one portion supported by a support metal member on a wall surface of the cable compartment, the at least one portion between a cable lead-in portion of the cable and a cable terminal of the cable, whereby an outer surface of the cable is grounded.

2. The switchgear according to claim 1, wherein
at a portion where a sectional area changes in a pressure discharge path leading from an inside of each compartment of the plurality of compartments to the corresponding opening portion, a wall surface of the compartment has a slope such that the sectional area gradually changes.

3. A switchgear in which the inside of a housing is partitioned into a plurality of compartments, the plurality of compartments including a bus compartment and apparatus compartments, and a bus and apparatuses forming two or more lines of branch circuits branching from the bus are respectively contained in the bus compartment and the apparatus compartments, wherein the apparatuses forming the branch circuits are placed at an upper stage and a lower stage in the housing and are displaced from each other in the right-left direction, spaces formed between a side wall of the housing and side walls of upper-stage apparatus compartments of the apparatus compartments containing the apparatuses placed at the upper stage, are used as paths leading to a housing ceiling for lower-stage apparatus compartments of the apparatus compartments containing the apparatuses placed at the lower stage, the bus compartment containing the bus and all the apparatus compartments are each individually connected directly to a ceiling portion of the housing and each have an opening portion on the ceiling portion, which opens to an outside of the housing, the opening portion of each of the lower-stage apparatus compartments have partial overlaps with a corresponding one of the lower-stage apparatus compartments as seen from a vertical direction, the apparatuses forming each branch circuit have at least a breaker and a cable connected to the breaker for each branch circuit, each breaker is respectively contained in a respective breaker compartment of the apparatus compartments at the upper stage and the lower stage placed in front of the bus compartment, each cable is respectively contained in a respective cable compartment of the apparatus compartments at the upper stage and the lower stage placed in back of the bus compartment, and the cable contained in each cable compartment has at least one portion supported by a support metal member on a wall surface of the cable compartment, the at least one portion between a cable lead-in portion of the cable and a cable terminal of the cable, whereby an outer surface of the cable is grounded.

* * * * *